United States Patent [19]

Goekjian

[11] Patent Number: 4,878,173
[45] Date of Patent: Oct. 31, 1989

[54] CONTROLLER BURST MULTIPLEXOR CHANNEL INTERFACE

[75] Inventor: Kenneth S. Goekjian, Candia, N.H.

[73] Assignee: Data General Corporation, Westboro, Mass.

[21] Appl. No.: 194,685

[22] Filed: May 16, 1988

[51] Int. Cl.$^4$ ............................................. G06F 3/00
[52] U.S. Cl. .................................. 364/200; 364/238; 364/238.3
[58] Field of Search ....................... 364/200, 300, 900

[56] References Cited

U.S. PATENT DOCUMENTS 4,403,282 9/1983 Holberger et al. ............... 364/200

Primary Examiner—Raulfe B. Zache
Attorney, Agent, or Firm—Jacob Frank; Joel Wall; Irving M. Kriegsman

[57] ABSTRACT

A data processing system in which the interface for connecting a host controller to a burst multiplexor channel comprises two sections one to handle the transfer of data and the other to handle the transfer of command and status information. The interface also includes logic to monitor the division of any transfer into bursts and logic to arbitrate for the two sections for any given burst.

1 Claim, 3 Drawing Sheets

CONTROLLER BURST MULTIPLEXOR CHANNEL INTERFACE

BACKGROUND OF THE INVENTION

The present invention relates to a data processing system which includes a burst multiplexor channel (BMC) for transferring command information, data and status information between a host controller and a host memory and more particularly to an improvement in the interface for interfacing the controller to the burst multiplexor channel.

In U.S. Pat. No. 4,403,282 there is disclosed a data processing system having a central processor unit (CPU) and a memory and further including a high speed, or "burst multiplexer", channel for permitting direct access to the memory by an input/output (I/O) device without the need to use registers and control signals from the central processor unit. The high speed channel utilizes its own memory port separate from that of the CPU and includes internal paths for transferring addresses and data between an I/O device and the memory. The channel further includes a memory allocation unit (MAP) which can be loaded by transfer of memory allocation data viz substantially the same common path as the I/O data transfer. Appropriate control logic is also included to control the data and address transfer and the MAP load and dump operations so that blocks of data words can be transferred sequentially and directly to or from the memory.

In data processing systems using a BMC, the BMC (i.e. the BMC board and the associated pair of cables) from the point of view of the controller is a high-speed interface to host memory, and may be used for the transfer of command information, data, or status information between the controller and host memory.

Until now, controllers have used the BMC to transfer command information, data, and status information to and from the host processor's memory. However, since the controller initiates and controls the transfer. it must keep track of the host memory addresses being accessed and the amount of information to be transferred. It thus becomes impractical to interleave packets of one type of information with any other type (e.g. command and data), even through the BMC is perfectly capable of supporting such interleaving.

In intelligent controllers (i.e. controllers incorporating a microprocessor) the data transfer itself is generally accomplished independent of the controller's microprocessor, leaving that microprocessor free for other tasks, such a pre-processing the next command or post-processing the previous one and returning status to the host processor. It is generally necessary for the microprocessor to access the appropriate information in host memory (command or status) in order to complete said processing, but, since the BMC interface is tied up doing the data transfer, this access must be delayed, stalling the microprocessor, wasting valuable processing time, increasing overheads and decreasing performance.

SUMMARY OF THE INVENTION

According to this invention there are two complete BMC interfaces (i.e. a dual interface) within the controller, one interface to handle the transfer of data to and from host memory, and the other interface to handle the transfer of command and status information. According to another feature of the invention this dual interface is made to appear as one standard interface to the BMC.

In order to meet space limitations, the basic BMC interface control logic is implemented in a gate-array. The gate-array includes the basic control functions, an expandable 8-bit word counter, and the address counter and decode logic. It does not include the actual data paths, only the control signals applicable thereto.

To implement the dual interface, there are two gate-arrays, three sheets of data FIFOs and two sets of map information FIFOs. To make this dual interface appear as one interface to the BMC, logic is provided to monitor the division of any transfer into bursts, and to arbitrate between the two channels for any given burst. Thus, since access to the BMC is granted to only one interface at a time, the BMC sees only a single interface.

The arbitration between the two interfaces is accomplished at two levels. The first level of arbitration determines whether a given interface is ready to transfer a burst of data by comparing the size of the desired burst amount of data in the FIFOs, as indicated by the FIFO Content Counter for that level of arbitration, indicating that this interface is ready to access the BMC.

The second level of arbitration actually determines which of the 2 interfaces shall have access to the BMC, based on which interfaces are ready, if any, and which interface last had access to the BMC. If both interfaces are ready in time for the same burst, then the interface that had access to the BMC LEAST recently will be given access.

Various features and advantages will appear from the description to follow. In the description, reference is made to the accompanying drawing which forms a part thereof, and in which is shown by way of illustration, a specific embodiment for practicing the invention. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF THE DRAWINGS

Figure 1:
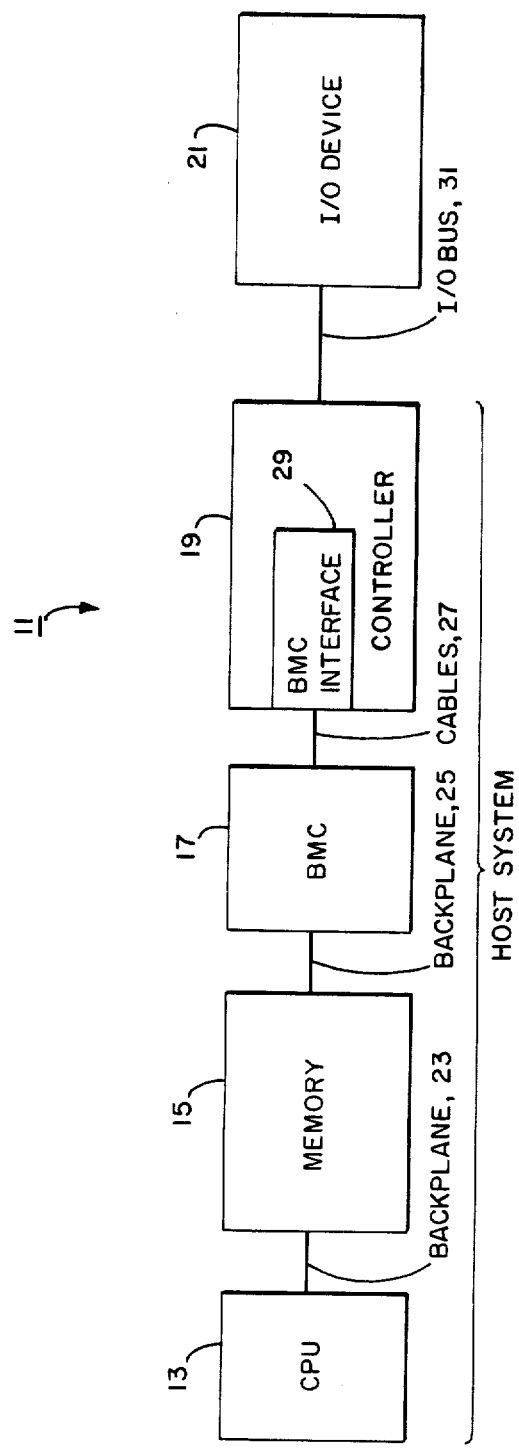
FIG. 1 is a block diagram of a data processing system according to this invention.

Referring now to the drawings, there is shown in FIG. 1 a data processing system 11 constructed according to this invention.

System 11 includes a central processor unit (CPU) 13, a memory 15, a burst multiplexor channel (BMC) 17 a controller 19 and an I/O device 21. Memory 15 is connected to CPU 13 by a backplane 23. BMC 17 is connected to memory 15 by a backplane 25. A set of cables 27 are connected at one end to BMC 17 and at the other end to a controller BMC interface 29 in controller 19. I/O device 21 is connected to controller 19 by an I/O bus 31.

BMC 17 may be a BMC such as described in U.S. Pat. No. 4,403,282.

Figure 2:
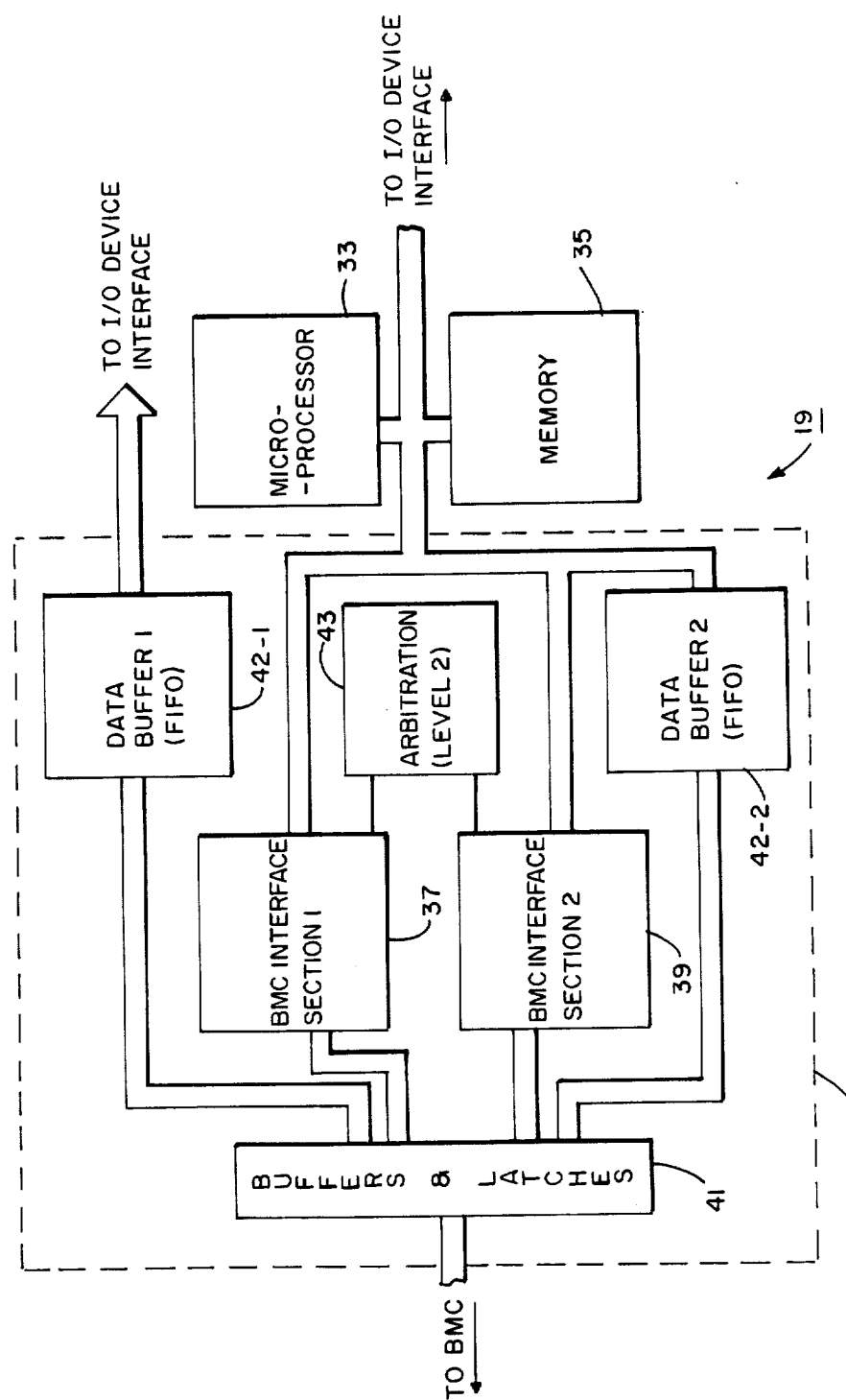
FIG. 2 is a block diagram of the controller shown in FIG. 1.

Controller 19, which is shown in more detail in FIG. 2, includes a microprocessor 33, a memory 35 and BMC interface 29. Interface 29 includes a first BMC interface section 37, a second BMC interface section 39, a buffer section 41 a first data buffer section 42-1, a second data buffer section 42-2 and an arbitration section 43. First BMC interface section 37 is used to handle the transfer of data while the second BMC interface section 39 is used to handle the transfer of command and status information. Arbitration section 43 is used to artibrate between interface sections 37 and 39.

Figure 3:
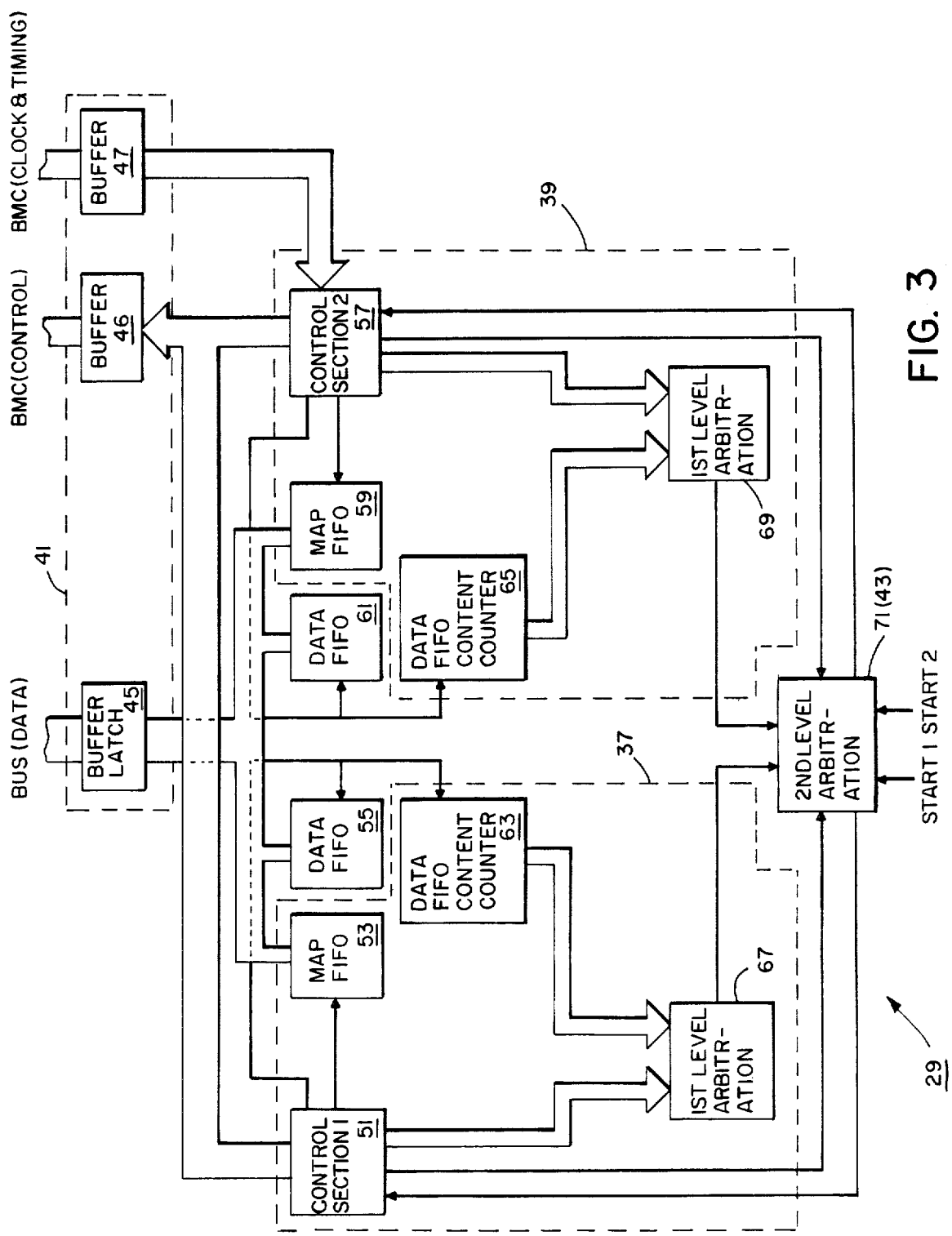
FIG. 3 is a block diagram of the controller BMC interface shown in FIG. 2.

A more detailed block diagram of controller BMC interface 29 is shown in FIG. 3.

As can be seen, controller BMC interface 29 includes three buffer sections 45, 47 and 49, a first control section 51 a first MAP FIFO 53, a first DATA FIFO 55, a second control section 57, a second MAP FIFO 59, a second DATA FIFO 61, first and second DATA FIFO content counter sections 63 and 65, respectively, first and second first level arbitration sections 67 and 69, respectively, and a second level arbitration section 71.

Buffer latch 45 latches the data coming from the BMC cable 27 and the data going to the cable 27. It also includes the drivers to put the data from the output latch onto cable 27.

Buffer section 47 drives the control signals from the interface logic, such as the host memory address, mapping mode and burst size (amount of data to be transferred in this burst) onto BMC cable 27.

Buffer section 49 buffers the incoming clock and control signals and generates the basic timing signals necessary to the interface logic.

Control section 51 comprises a gate-array, along with support logic, and represents the control function of interface section 37.

MAP FIFO 53 used to store mapping information that it to be sent to the Host BMC Memory Map circuitry. The mapping information is supplied by the controller microprocessor 33.

Data FIFO section 55 is used for data transfer to and from Host memory. Buffers surrounding the FIFO allow transfer in either direction. Information may be transferred between the BMC and Ichor, the controller microprocessor and the BMC, or the controller microprocessor and Ichor, through these FIFOs. In general, data is transferred between the BMC and Ichor.

Data FIFO content counter 63 keeps track of the amount of data in the FIFO data section 55.

Control section 57, map FIFO section 59 and data FIFO section 61 and data FIFO content counter section 65 correspond to sections 51, 53, 55 and 63, respectively in the first interface section.

First level arbitration block 67 determines whether the first section is ready to transfer a burst of data, i.e., whether there is enough space or enough data (depending on the direction of transfer) in the FIFO to allow a burst of data to be transferred. First level arbitration block section 69 performs a similar function for the second section.

Second level arbitration block 71 decides which of the two interfaces will next be given access to the BMC bus, based on previous history and the readiness of each channel (section), as supplied by section 67 and 69.

What is claimed is:
1. A data processing system comprising:
   a. a central processor unit,
   b. a memory connected to said central processor unit,
   c. a burst multiplexor channel connected to said memory,
   d. a controller, and
   e. an interface for connecting said controller to said burst multiplexor channel, said interface including two sections, one section handling the transfer of data and the other handling the transfer of command and status information.

* * * * *